(12) United States Patent
Sagawa et al.

(10) Patent No.: US 7,732,545 B2
(45) Date of Patent: Jun. 8, 2010

(54) PROCESS FOR PREPARING AQUEOUS DISPERSION

(75) Inventors: Toshimasa Sagawa, Kitaibaraki (JP); Haruyoshi Tatsu, Kitaibaraki (JP); Masayosi Horiuti, Kitaibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 10/541,330

(22) PCT Filed: Jan. 21, 2004

(86) PCT No.: PCT/JP2004/000459

§ 371 (c)(1),
(2), (4) Date: Jul. 1, 2005

(87) PCT Pub. No.: WO2004/067579

PCT Pub. Date: Aug. 12, 2004

(65) Prior Publication Data

US 2006/0052516 A1   Mar. 9, 2006

(30) Foreign Application Priority Data

Jan. 28, 2003   (JP)   ............................. 2003-018169

(51) Int. Cl.
*C08F 18/20* (2006.01)
*C08F 20/10* (2006.01)
*C08F 20/20* (2006.01)
*C08F 10/14* (2006.01)

(52) U.S. Cl. ........................ 526/245; 526/348; 526/318; 526/318.43

(58) Field of Classification Search ................. 526/245, 526/348, 318, 318.43
See application file for complete search history.

(56) References Cited

U.S. PATENT DOCUMENTS

| 5,639,820 | A | 6/1997 | Kubo et al. |
| 6,180,740 | B1 * | 1/2001 | Fitzgerald .................... 526/245 |
| 6,387,292 | B1 * | 5/2002 | Saito ......................... 252/8.62 |
| 6,610,775 | B1 | 8/2003 | Oharu et al. |
| 2003/0114547 | A1 * | 6/2003 | Hara et al. ..................... 521/50 |

FOREIGN PATENT DOCUMENTS

| JP | B-4-32873 | 6/1992 |
| JP | 5-17538 | 1/1993 |
| JP | 5-263070 | 10/1993 |
| JP | B-6-74409 | 9/1994 |
| JP | 7-179528 | 7/1995 |
| JP | 8-59752 | 3/1996 |
| JP | A-11-255995 | 9/1999 |
| JP | 2000-160149 | 6/2000 |
| JP | 2001-98033 | 4/2001 |
| JP | 2002-241441 | 8/2002 |
| JP | 2002-256130 | 9/2002 |
| JP | 2002-275453 | 9/2002 |
| WO | WO 00/43462 | 7/2002 |

* cited by examiner

*Primary Examiner*—William K Cheung
(74) *Attorney, Agent, or Firm*—Brinks Hofer Gilson & Lione

(57) ABSTRACT

An aqueous dispersion is prepared by subjecting (meth)acrylate containing a polyfluoroalkyl group and a polymerizable monomer containing no fluorine atom to an emulsification treatment in the presence of a surfactant and a polypropyleneglycol-based compound having a molecular weight of 250 to 5,000, followed by copolymerization reaction in the presence of a polymerization initiator. The resulting aqueous dispersion, even if prepared from (meth)acrylate copolymer containing mixed perfluoroalkyl groups including perfluoroalkyl groups having 12 or more carbon atoms as polyfluoroalkyl groups, has a distinguished emulsion stability and thus can be effectively used as a water and oil repellent, etc.

10 Claims, No Drawings

PROCESS FOR PREPARING AQUEOUS DISPERSION

TECHNICAL FIELD

The present invention relates to a process for preparing an aqueous dispersion, and more particularly to a process for preparing an aqueous dispersion with a distinguished emulsion stability and of suitable use for a water and oil repellent, etc.

BACKGROUND ART

It is now in wide use to make fibers having a water and oil repellency, using a water and oil repellent comprising a (meth)acrylate copolymer containing a polyfluoroalkyl group, mostly a perfluoroalkyl group, as an effective component. (Meth)acrylate containing a perfluoroalkyl group (Rf group) can be made from a compound Rf I through various reactions, where the perfluoroalkyl iodide Rf I can be synthesized by telomerization of $C_2F_5I$ as a starting material, and the resulting product is a mixture of compounds represented by the general formula $C_nF_{2n+1}$, with a distribution in chain lengths of various n values.

Generally, components $C_6F_{13}I$ to $C_{14}F_{29}I$ are used as effective components, whereas components $C_{16}F_{33}I$ or higher n value components have no effective utility and components $C_{12}F_{25}I$~$C_{14}F_{29}I$ are discarded because of the imbalance between the production and the consumption. From the viewpoints of recent environmental protection control and economy, on the other hand, effective utilization of these unutilized resources and discarded components is now highly desirable. Preparation of an aqueous dispersion of (meth)acrylate polymers containing $C_{12}F_{25}$ or longer chain Rf groups has such a problem that the resulting aqueous dispersion has an unsatisfactory emulsion stability.

In the case of preparing aqueous dispersion of (meth)acrylate copolymers containing perfluoroalkyl groups, it has been so far proposed to add triethyleneglycol dimethyl ether, tetraethyleneglycol dimethyl ether, dipropyleneglycol, 1,6-hexanediol, 1,5-pentanediol, diethyl succinate, etc. thereto (JP-B-4-32873, JP-B-6-74409 and U.S. Pat. No. 6,180,740), but these methods have been found that the aqueous dispersions of (meth)acrylate copolymers containing mixed perfluoroalkyl groups including perfluoroalkyl groups of 12 or more carbon atoms, particularly 16 or more carbon atoms have quite an unsatisfactory emulsion stability.

The present applicant proposed earlier a process for preparing an aqueous emulsion by subjecting (meth)acrylate containing a polyfluoroalkyl group and stearyl (meth)acrylate to emulsion polymerization at a pH of 2 to 5.5 with a betaine-type emulsifier and a nonionic emulsifier (JP-A-11-255,995), but further improvements have been found still necessary with respect to the emulsion stability of aqueous dispersion, typically weight percent precipitate, 10% particle size, 50% particle size, 90% particle size, etc.

DISCLOSURE OF THE INVENTION

An object of the present invention is to provide a process for preparing an aqueous dispersion with a distinguished emulsion stability and of effective use for a water and oil repellent, etc., which comprises a copolymer of (meth)acrylate containing mixed perfluoroalkyl groups, even if including perfluoroalkyl groups of 12 or more carbon atoms, as a polyfluoroalkyl group.

The object of the present invention can be attained by subjecting (meth)acrylate containing a polyfluoroalkyl group and a polymerizable monomer containing no fluorine atom to an emulsification treatment in the presence of a surfactant and a polypropyleneglycol-based compound having a molecular weight of 250 to 5,000, followed by copolymerization reaction in the presence of a polymerization initiator, thereby preparing an aqueous dispersion, where the term "(meth) acrylate" means acrylate or methacrylate.

(Meth)acrylate containing a polyfluoroalkyl group represented by the following general formula can be used in the present invention:

where
R: a hydrogen atom or a methyl group
$R_1$: a divalent organic group, preferably a divalent organic group represented by the following general formula $C_mH_{2m}$ (where m: 1 to 6) or $C_mH_{2m}N(R')SO_2$ (where m: 1 to 6 and R' a lower alkyl group having 1 to 5 carbon atoms)
Rf: a polyfluoroalkyl group having 4 to 20 carbon atoms For example, the following (meth)acrylate compounds containing a polyfluoroalkyl group are typical compounds for use in the present invention.

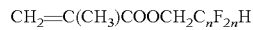

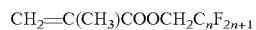

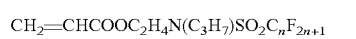

Perfluoroalkyl groups in these (meth)acrylates containing a polyfluoroalkyl group can be mixed $C_nF_{2n+1}$ groups having various n values, and even if a copolymer of (meth)acrylate containing a polyfluoroalkyl group mixed with perfluoroalkyl groups having 12 or more carbon atoms, or occasionally 16 or more carbon atoms, is used, an aqueous emulsion with a distinguish-ed emulsion stability can be obtained in the present invention. The (meth)acrylate containing a polyfluoroalkyl group is subjected to copolymerization in a proportion of 10 wt. % or more, preferably 25 to 75 wt. %, on the basis of the copolymer for preparing a aqueous dispersion, and reveal the water and oil repellency.

Polymerizable monomer containing no fluorine atom for use in copolymerization with the (meth)acrylate containing a polyfluoroalkyl group includes, for example, acrylate esters or methacrylate esters as esterified with an alkyl group such as methyl, ethyl, propyl, isopropyl, n-butyl, n-hexyl, 2-ethylhexyl, n-octyl, lauryl, stearyl, etc.; a cycloalkyl group such as cyclohexyl, etc.; an aralkyl group such as benzyl, etc.; and an alkoxyalkyl group such as methoxymethyl, 2-methoxyethyl, 2-ethoxyethyl, 2-butoxyethyl, 3-ethoxypropyl, etc.: dialkyl fumarate or maleate esters as esterified with dimethyl, dipropyl, dibutyl, dioctyl, etc.: and vinyl esters such as vinyl acetate, vinyl caprylate, etc., among which lauryl acrylate, stearyl (meth)acrylate, cyclohexyl methacrylate, benzyl methacrylate, etc. are preferable from the viewpoint of a balance between the water repellency and the oil repellency, and particularly preferably stearyl acrylate is used alone or in combination with cyclohexyl methacrylate, benzyl methacrylate, etc. The polymerizable monomer containing no fluorine atom is contained in a proportion of 90 wt. % or less, preferably 75 to 25 wt. %, on the basis of the copolymer for preparing the aqueous dispersion.

Other copolymerizable monomer can be copolymerized in such a range as not to deteriorate the copolymer characteristics, for example, in a proportion of 30 wt. % or less on the basis of the copolymer. Such copolymerizable monomer includes, for example, a vinyl compound such as styrene, vinyltoluene, α-methylstyrene, vinylnaphthalene, acrylonitrile, methacrylonitrile, acetone acrylamide, 2-hydroxyethyl acrylate, 4-hydroxybutyl acrylate, 2-hydroxy-3-chloropropyl (meth)acrylate, polyethyleneglycol mono(meth)acrylate, polypropyleneglycol mono(meth)acrylate, vinyl chloride, vinylidene chloride, vinyl fluoride, vinylidene fluoride, 2-chloroethyl vinyl ether, 2-hydroxyethyl vinyl ether, 4-hyrdroxybutyl vinyl ether, etc., and a diolefin such as isoprene, pentadiene, butadiene, etc.

If necessary, a polyfunctional monomer or oligomer can be copolymerized in a proportion of 30 wt. % or less on the basis of the copolymer. Such a polyfunctional monomer or oligomer includes, for example, a poly (meth)acrylate such as ethyleneglycol di(meth)acrylate, propyleneglycol di(meth)acrylate, 1,4-butanediol di(meth)acrylate, 1,6-hexanediol di(meth)acrylate, 1,9-nonanediol di(meth)acrylate, neopentylglycol di(meth)acrylate, tetraethyleneglycol di(meth)acrylate, tripropyleneglycol di(meth)acrylate, polypropyleneglycol di(meth)acrylate, bisphenol A.ethylene oxide adduct diacrylate, dimethylol tricyclodecane diacrylate, glycerin methacrylate acrylate, 3-acryloyloxyglycerin monomethacrylate, etc. or an oligomer such as polybutadien oligomer, polypentadiene oligomer, etc.

These polymerizable monomers are subjected to copolymerization in the presence of a surfactant emulsifier and an emulsification aid of polypropyleneglycol-based compound having a molecular weight of 250 to 5,000, preferably 300 to 3,000.

As a preferable surfactant acting as an emulsifier, at least one of polyethylene oxide-based nonionic surfactant and cationic surfactant is used in a proportion of 1 to 20 wt. %, preferably 5 to 15 wt. % on the basis of sum total of the comonomers. The polyethylene oxide-based nonionic surfactant includes, for example, condensation products of polyethylene oxide with hexylphenol, octylphenol, nonylphenol, polycyclic phenyl ether, hexadecanol, oleic acid, alkylamines of $C_{12}$ to $C_{18}$, sorbitan monofatty acid, etc., preferably a condensation product of polyethylene oxide (n=10 to 90) with octyl phenol or nonyl phenol. The cationic surfactant includes, for example, a quaternary ammonium salt such as stearyltrimethylammonium chloride, dodecyltrimethylammonium acetate, dodecyltrimethylammonium chloride, tetradecyltrimethylammonium chloride, hexadecyltrimethylammonium chloride, octadecyltrimethylammonium chloride, dodecylbenzyltrimethylammonium chloride, dodecylmethyldi(polyoxyethylene)ammonium chloride, dioctadecyldimethylammonium chloride, etc., or an alkylpyridinium salt.

The polypropyleneglycol-based compound as an emulsification aid for use in combination with the emulsifier includes, for example, polypropyleneglycol, its terminal monomethyl ether, glycerin.propyleneglycol adduct, etc., and is used in a proportion of 10 to 100 wt. %, preferably 15 to 70 wt. %, on the basis of sum total of comonomers. In the case of using a polypropyleneglycol-based compound having a molecular weight of less than 250, or using no such a compound, or using dipropyleneglycol (molecular weight 134) or 1,6-hexanediol in place of the polypropyleneglycol-based compound, emulsion stability of an aqueous dispersion, typically weight percent precipitate, 10% particle size, 50% particle size and 90% particle size, will be lowered.

Prior to the copolymerization reaction, emulsification treatment of a polymerizable monomer mixtures including (meth)acrylate containing a polyfluoroalkyl group and polymerizable monomer containing no fluorine atom is carried out in the presence of the surfactant emulsifier and the emulsification aid of polypropyleneglycol-based compound. The emulsification treatment can be satisfactorily carried out in a high-pressure homogenizer, etc.

Copolymerization reaction of emulsification-treated polymerizable monomers is carried out in the presence of a radical polymerization initiator added thereto. As a radical polymerization initiator, any one of an organic peroxide, an azo compound, a persulfate, etc. can be used, and preferably a water-soluble radical polymerization initiator such as potassium persulfate, ammonium persulfate, 2,2'-azobis(2-amidinopropane).dihydrochloride, etc. is used. The reaction is carried out in an aqueous medium at about 40° to about 80° C. for about 1 to about 10 hours, whereby an aqueous dispersion (aqueous emulsion) having a solid concentration of about 15 to about 35 wt. % is formed.

At that time, a monomer having a cross-linkable group such as an acrylamide or its derivative, e.g. acrylamide, N-methylol (meth)acrylamide, N-methoxymethyl acrylamide, N-butoxymethyl acrylamide, etc., or glycidyl (meth) acrylate, etc. can be used together with the radical polymerization initiator, and can be copolymerized in a proportion of about 10 wt. % or less, preferably about 0.5 to about 7 wt. %, on the basis of the copolymer. The further copolymerization of the monomer containing a cross-linkable group can improve the durability of water and oil repellent upon cross-linking with the hydroxyl groups on the fiber surfaces or upon self cross-linking. Furthermore, a blocked isocyanate, melamine resin, urea resin, etc. can be also added to the aqueous dispersion as a cross-linking agent.

Other water repellents such as a polymer extender, silicone resin, oil, wax, etc. and necessary additives for the water and oil repellent use such as an insect repellent, an antistatic agent, a dye stabilizer, a crease-proofing agent, a stain blocker, etc. can be further added to the aqueous dispersion.

The aqueous dispersion so prepared is effectively applied to paper, films, fibers, cloth, fabrics, carpets or cloth products made of filaments, fibers, threads, etc. or the like as a water and oil repellent. Application can be made usually by coating, dipping, spraying, padding, roll coating or their combination.

For example, by adjusting a bath of the aqueous dispersion to a solid concentration of about 0.1 to about 10 wt. %, the bath can be used as a pad bath. A material to be treated is padded in the pad bath, followed by removal of excess aqueous dispersion through squeezing rolls and drying to retain about 0.01 to about 10 wt. % of the copolymer on the basis of the material. Then, further drying is conducted usually at about 100° to about 200° C. for about 1 minute to about 2 hours, though depending on the kind of material to be treated, to complete the water and oil repellent treatment.

BEST MODES FOR CARRYING OUT THE INVENTION

The present invention will be described below, referring to Examples.

Example 1

| | Parts by weight |
|---|---|
| Perfluoroalkylethyl acrylate (perfluoroalkyl groups: a mixture of 6% $C_6$, 52% $C_8$, 24% $C_{10}$, 7% $C_{12}$ and 2% $C_{14}$ in sum total of 91% with an average number of carbon atoms of 8.8) | 133.5 |
| Stearyl acrylate | 148.5 |
| Lauryl mercaptan | 0.9 |
| Polypropyleneglycol (Uniol D-400, a product of NOF Corp.; molecular weight: 400) | 57.0 |
| Polyoxyethylene (n: 30) mono(nonylphenyl) ether | 2.5 |
| Polyoxyethylene (n: 50) mono(nonylphenyl) ether | 8.6 |
| Stearyltrimethylammonium chloride | 15.6 |
| Deionized water | 400.7 |

The foregoing components were placed into a reactor and subjected to an emulsification treatment at 60 MPa, using a high pressure homogenizer. The resulting emulsion was flushed with $N_2$ gas for 30 minutes. Then, the reactor inside temperature was slowly elevated up to 40° C., where upon 11.8 parts by weight of N-methylol acrylamide dissolved in 100 parts by weight of deionized water and 5.9 parts by weight of 2,2-azobis(2-amidinopropane).dihydrochloride dissolved in 100 parts by weight of deionized water were charged into the reactor, and the reactor inside temperature was slowly elevated up to 70° C. and subjected to reaction for 4 hours. After the reaction, the reactor was cooled, and 978 parts by weight of an aqueous dispersion having a solid concentration of 32 wt. % was obtained.

Example 2

In Example 1, the same amount of another perfluoroalkylethyl acrylate (perfluoroalkyl group: a mixture of 2% $C_6$, 39% $C_8$, 37% $C_{10}$ 10% $C_{12}$, 2% $C_{14}$, 0.6% $C_{16}$ and 0.1% $C_{18}$ in sum total of 91% with an average number of carbon atoms of 9.4) was used.

Example 3

In Example 1, the same amount of another perfluoroalkylethyl acrylate (perfluoroalkyl group: a mixture of 2.5% $C_6$, 65% $C_8$, 26% $C_{10}$ and 1% $C_{12}$, in sum total of 95% with an average number of carbon atoms of 8.1) was used.

Comparative Example 1

In Example 1, the same amount of dipropyleneglycol (molecular weight: 134) was used in place of polypropyleneglycol (molecular weight: 400).

Comparative Example 2

In Example 1, the same amount of 1,6-hexanediol was used in place of polypropyleneglycol (molecular weight: 400).

Solid concentrations of aqueous dispersions obtained in the foregoing Examples and Comparative Examples were adjusted to 0.5 wt. % by deionized water, and then cotton/polyester mixed fabrics, polyester fabrics and polyamide fabrics were dipped into the aqueous dispersions to determine water repellency (according to JIS L1092) and oil repellency (according to AATCC-TM118-1966, indicating oil repellency number given in its Table 2). Wet pick up after the squeezing at that time was 100% for the cotton/polyester mixed fabrics, 40% for the polyester fabrics, and 60% for the polyamide fabrics, and the drying conditions were 80° C. for 10 minutes for all the fabrics, and the curing conditions were 150° C. for 3 minutes for the cotton/polyester mixed fabrics and the polyester fabrics, and 170° C. for 1.5 minutes for the polyamide fabrics.

800 ml of the aqueous dispersions before the dilution with deionized water were individually charged into centrifuge tubes and subjected to centrifugal separation at 3,000 rpm for 30 minutes. Weight percent precipitates were calculated from the individual weights measured after drying the precipitates at 120° C. for 3 hours. Furthermore, particle sizes at 10%, 50% and 90% cumulative frequencies in the order from the smaller particle sizes toward larger ones were determined as 10% particle size, 50% particle size (average particle size) and 90% particle size by a particle size distribution meter MICROTRAC UPA 150.

The results are shown in the following Table 1.

TABLE 1

| Determination items | Ex. 1 | Ex. 2 | Ex. 3 | Comp. Ex. 1 | Comp. Ex. 2 |
|---|---|---|---|---|---|
| [Water repellency] | | | | | |
| Cotton/polyester mixed fabrics | 100 | 100 | 100 | 100 | 100 |
| Polyester fabrics | 100 | 100 | 100 | 100 | 100 |
| Polyamide fabrics | 100 | 100 | 100 | 90 | 100 |
| [Oil repellency] | | | | | |
| Cotton/polyester mixed fabrics | 7 | 7 | 7 | 7 | 7 |
| Polyester fabrics | 8 | 8 | 8 | 8 | 8 |
| Polyamide fabrics | 5 | 5 | 5 | 4 | 5 |

TABLE 1-continued

| Determination items | Ex. 1 | Ex. 2 | Ex. 3 | Comp. Ex. 1 | Comp. Ex. 2 |
|---|---|---|---|---|---|
| [Aqueous dispersion] | | | | | |
| Weight percent precipitate (%) | 0.002 | 0.008 | 0.000 | 0.892 | 0.453 |
| 10% particle size (μm) | 0.0278 | 0.0314 | 0.0265 | 0.0623 | 0.0370 |
| 50% particle size (μm) | 0.0430 | 0.0477 | 0.0427 | 0.0893 | 0.0697 |
| 90% particle size (μm) | 0.0678 | 0.0718 | 0.0718 | 0.1384 | 0.1210 |

Example 4

In Example 1, 26.5 parts by weight of 148.5 parts by weight of stearyl acrylate was changed to benzyl methacrylate, and the same amount of another polypropyleneglycol (Uniol D-250, a product of NFO Corp., molecular weight: 250) was used to prepare an emulsion.

Example 5

In Example 4, the same amount of cychohexyl methacrylate was used in place of benzyl methacrylate.

Example 6

In Example 5, the same amount of another polypropyleneglycol (Uniol D-600, a product of NFO Corp.; molecular weight: 600) was used.

Example 7

In Example 5, the same amount of polypropyleneglycol monomethyl ether (Uniol MME, a product of NFO Corp.; molecular weight: 400) was used in place of polypropyleneglycol.

Example 8

In Example 1, the same amount of glycerin.polypropyleneglycol adduct $HO(C_3H_6O)_pCH$ $[CH_2O(C_3H_6O)_qH]$ $[CH_2O(C_3H_6O)_rH]$ (Uniol TG-330, a product of NFO Corp.; molecular weight 330) was used in place of polypropyleneglycol.

Results of determination in the foregoing Examples 4 to 8 are given in the following Table 2.

INDUSTRIAL UTILITY

As shown by data of weight percent precipitate, and 10%, 50% and 90% particle sizes, the present aqueous dispersion has a distinguished emulsion stability, and use of an emulsification aid of polypropyleneglycol-based compound together with a surfactant emulsifier enables the aqueous dispersion to have distinguished uniformity and mixing stability in the emulsification treatment, giving a distinguished water and oil repellency to materials treated with the present aqueous dispersion when used as a water and oil repellent.

Even if a (meth)acrylate copolymer containing mixed perfluoroalkyl groups including those having 12 or more carbon atoms, occasionally 16 or more carbon atoms, is used, an aqueous dispersion having a distinguished emulsion stability can be obtained.

The invention claimed is:

1. A process for preparing an aqueous dispersion which comprises subjecting (meth)acrylate containing a polyfluoroalkyl group and a polymerizable monomer free of fluorine atoms to an emulsification treatment in the presence of water, a nonionic surfactant comprising a condensation product of polyethylene oxide (n=10-90) and octyl phenol or nonyl phenol and a cationic surfactant, and a polypropyleneglycol-based compound having a molecular weight of 250 to 5,000, followed by copolymerization reaction in the presence of a polymerization initiator.

2. A process for preparing an aqueous dispersion according to claim 1, wherein the (meth)acrylate containing a polyfluoroalkyl group is present in a proportion of at least 10 wt. % on the basis of the resulting copolymer.

3. A process for preparing an aqueous dispersion according to claim 1, wherein the (meth)acrylate containing a polyfluoroalkyl group is a (meth)acrylate containing mixed perfluo-

TABLE 2

| Determination items | Ex. 4 | Ex. 5 | Ex. 6 | Ex. 7 | Ex. 8 |
|---|---|---|---|---|---|
| [Water repellency] | | | | | |
| Cotton/polyester mixed fabrics | 100 | 100 | 100 | 100 | 100 |
| Polyester fabrics | 100 | 100 | 100 | 100 | 100 |
| Polyamide fabrics | 100 | 100 | 100 | 100 | 100 |
| [Oil repellency] | | | | | |
| Cotton/polyester mixed fabrics | 7 | 7 | 7 | 7 | 7 |
| Polyester fabrics | 8 | 8 | 8 | 8 | 8 |
| Polyamide fabrics | 5 | 5 | 5 | 5 | 5 |
| [Aqueous dispersion] | | | | | |
| Weight percent precipitate (%) | 0.011 | 0.003 | 0.009 | 0.016 | 0.010 |
| 10% particle size (μm) | 0.0288 | 0.0314 | 0.0272 | 0.0333 | 0.0274 |
| 50% particle size (μm) | 0.0464 | 0.0473 | 0.0441 | 0.0522 | 0.0441 |
| 90% particle size (μm) | 0.0789 | 0.0742 | 0.0732 | 0.0811 | 0.0732 | roalkyl groups including perfluoroalkyl groups having 12 or more carbon atoms as a polyfluoroalkyl group.

4. A process for preparing an aqueous dispersion according to claim 1, wherein the polymerizable monomer free of fluorine atoms comprises at least one of (meth)acrylic acid ester, dialkyl ester of fumaric acid or maleic acid and vinyl ester.

5. A process for preparing an aqueous dispersion according to claim 4, wherein the (meth)acrylic acid ester comprises at least one of lauryl acrylate, stearyl (meth)acrylate, cyclohexyl methacrylate and benzyl methacrylate.

6. A process for preparing an aqueous dispersion according to claim 5, wherein the (meth)acrylic acid ester comprises stearyl acrylate.

7. A process for preparing an aqueous dispersion according to claim 1, wherein the polypropyleneglycol-based compound comprises at least one of polypropyleneglycol, its terminal monomethyl ether and glycerin polypropyleneglycol adduct.

8. A process for preparing an aqueous dispersion according to claim 1, wherein a polymerizable monomer containing a cross-linkable group is further copolymerized.

9. A process for preparing an aqueous dispersion according to claim 8, wherein the polymerizable monomer having a cross-linkable group is comprises at least one of acrylamide, its derivatives, and glycidyl (meth)acrylate.

10. A process for preparing an aqueous dispersion according to claim 6, wherein the stearyl acrylate is used in combination with at least one of cyclohexyl methacrylate or benzyl methacrylate.

* * * * *

UNITED STATES PATENT AND TRADEMARK OFFICE
CERTIFICATE OF CORRECTION

PATENT NO. : 7,732,545 B2
APPLICATION NO. : 10/541330
DATED : June 8, 2010
INVENTOR(S) : Toshimasa Sagawa, Haruyoshi Tatsu and Masayosi Horiuti It is certified that error appears in the above-identified patent and that said Letters Patent is hereby corrected as shown below:

Column 1, Line 23 should be changed from
"the general formula $C_nF_{2+1}$, with a distribution in chain"
to
-- the general formula $C_nF_{2n+1}$, with a distribution in chain--

Column 2, Line 37 should be changed from
"$CH_2=CHCOOC_3H_6C_nF_{2+1}$"
to
--$CH_2=CHCOOC_3H_6C_nF_{2n+1}$--

Column 2, Line 41 should be changed from
"$CH_2=CHCOOC_4H_8C_nF_{2+1}$"
to
--$CH_2=CHCOOC_4H_8C_nF_{2n+1}$--

Column 7, Lines 41 and 42 should be changed from
"In Example 1, the same amount of glycerin.polyproyle-neglycol adduct $HO(C_3H^6O)_pCH\ [CH_2O(C_3H_6O)_qH]$"
to
-- In Example 1, the same amount of glycerin · polyproyle-neglycol adduct $HO(C_3H^6O)_pCH\ [CH_2O(C_3H_6O)_qH]$--

Signed and Sealed this
Twenty-first Day of June, 2011

David J. Kappos
*Director of the United States Patent and Trademark Office*